April 8, 1941.    H. L. LUDWIG    2,237,389
TROLLING AND CASTING BAIT CARRIER AND HOOK
Filed Aug. 9, 1939
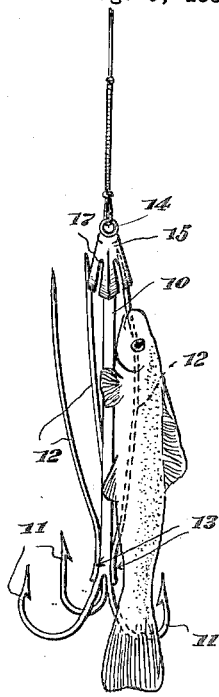
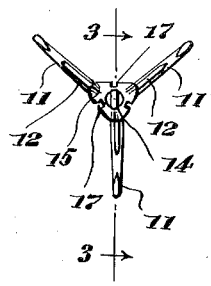
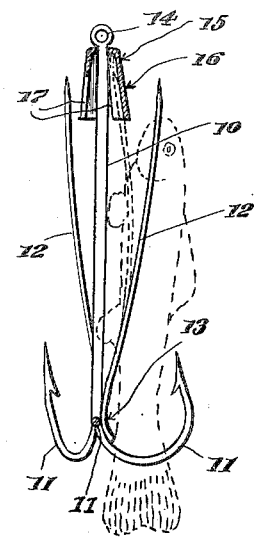
Inventor
HARRY L. LUDWIG
By Irving R. McCathran
Attorney Patented Apr. 8, 1941

2,237,389

UNITED STATES PATENT OFFICE 2,237,389

TROLLING AND CASTING BAIT CARRIER AND HOOK

Harry L. Ludwig, Miami, Fla., assignor to H. L. Ludwig and Son, Inc., Miami, Fla., a corporation of Florida Application August 9, 1939, Serial No. 289,286

3 Claims. (Cl. 43—40)

This invention relates to a trolling and casting bait carrier and hook, and has for one of its objects the production of a simple and efficient hook for facilitating the securing of the bait to the bait shanks in a manner whereby the bait shanks are fastened or locked at their ends opposite the hook to hold the bait against accidental removal therefrom, whether the shanks are in an open or a closed position.

A further object of this invention is the production of a simple and efficient means in the nature of a bait holder which is so constructed as to support the bait longitudinally of the hook shank through the medium of a bait shank which extends toward the line and toward the eye of the hook opposite the points of the hooks.

Other objects and advantages of the present invention will appear throughout the following specification and claims.

In the drawing:

Figure 1 is a perspective view of the improved bait carrier and hook showing a bait secured thereto and two of the bait-carrying shanks in an open position;

Figure 2 is an end elevation of the bait carrier and hook looking at the inner end thereof; and Figure 3 is an enlarged vertical sectional view taken on the line 3—3 of Figure 2.

By referring to the drawing, it will be seen that 10 designates the shank of the hook which is preferably provided with three outwardly flared hooks 11, which hooks are bent backwardly toward the shank 10 in the conventional manner, and in the manner shown.

A plurality of bait shanks 12 are secured to the shank 10 at the points 13 or locations where the hooks 11 join the shank 10, and these bait carrier shanks are preferably formed of spring wire and extend rearwardly toward the eye 14. A cone-like keeper 15 is carried by the shank 10 near the eye 14, and this keeper 15 flares outwardly in the direction of the barbs 11, the keeper being provided with longitudinal pockets 16 at the corners thereof. The keeper 15 is also provided with longitudinally extending slots 17 in the sides intermediate the pockets 16, as shown in Figures 1 and 3. The ends of the bait carrier shanks 12 are adapted to slip through the slots 17 and snap into position within the pockets 16 where the ends of the bait carrier shanks will be firmly locked in position against accidental displacement. These shanks 12 as stated above are preferably formed of spring wire and may be bowed slightly outwardly and are adapted to be penetrated through a bait such as a minnow, shown in Figure 1, by extending the shank 12 through the rectum and out through the head, the end of the shank being secured within one of the pockets 16 and in this way held firmly in a closed position. The spring nature of the shanks 12 will cause the bait to be firmly held against the shank 10 of the bait and hook carrier and the tail of the bait may swing freely between the hooks 11, thereby providing a camouflage, and at the same time keeping the hooks free for contact with a fish and the like. Although bait has been shown connected only to one bait-carrying shank, it should be understood that bait may be secured to each shank and preferably in a manner whereby the tails of the bait may extend between the hooks and camouflage the hooks.

It is important to note that the shanks 12, which may be in any number desired, are secured near the hooks 11 by being fixed in any suitable manner to the shank 10, and the free ends of these shanks 12 normally spring outwardly from the keeper 15 when released from the keeper, and a bait may be easily slipped over the end of the shank 12 by extending the shank longitudinally of the bait and then fastening the outer free end of the shank 12 within the pocket 16, the end of the shank 12 being extended first through the slot 17 and then moved laterally to slip into the pocket 16. The keeper 15, as stated above, preferably comprises a tapering cone-like cap the corners of which provide the pockets 16, which pockets 16 extend longitudinally toward the eye 14 of the shank 10.

It should be further understood that the pull of the bait against the water would tend to force the bait securely upon the shank even though the shank should become loosened or detached from the keeper 15 and this keeper 15 also will constitute a guard to provide weedless shanks. Furthermore the bait will not be likely to become detached or accidentally removed because of the fact that the free ends of the shanks 12 extend toward the keeper 15 and due to the fact that these shanks 12 are preferably of spring metal and are under tension, and this tension will tend to hold the ends of the shanks 12 within the pockets 16 of the keeper 15 and the bait will be firmly held upon the shanks 12 and against the shank 10.

It will be noted that the bait-carrying shanks 12 extend in the same direction as the hooks 11.

It should be understood that various types or kinds of bait may be used such as all natural bait, as angle worms, minnows, grasshoppers, crickets, frogs, and the like, and the bait may be preferably secured to the shanks 12 by passing the shanks 12 longitudinally through the bait so as to have a free swinging portion of the bait such as the tail or ends of the bait swing freely between the hooks 11. When a frog is secured to one of the shanks 12, it may be so mounted as to permit the legs of the frog to pass between the hooks 11.

Certain detail changes in the mechanical construction, may be employed without departing from the spirit of the invention, so long as such changes fall within the scope of the appended claims.

Having described the invention, what I claim is:

1. As an article of manufacture, a bait carrier and hook of the class described comprising an elongated shank having a plurality of rearwardly bent hooks, a plurality of longitudinally extending bait-carrying shanks secured to the first mentioned shank adjacent the hooks and having their free ends extending away from the hooks, the bait-carrying shanks being adapted to carry a bait longitudinally thereof for clamping bait against the first mentioned shank, and a keeper carried by the outer end of the first mentioned shank and provided with pockets for receiving the free ends of the bait-carrying shanks for locking the bait-carrying shanks in a closed position.

2. As an article of manufacture, a bait carrier and hook of the class described comprising an elongated shank having a plurality of rearwardly bent hooks, a plurality of longitudinally extending bait-carrying shanks secured to the first mentioned shank adjacent the hooks and having their free ends extending away from the hooks, the bait-carrying shanks being adapted to carry a bait longitudinally thereof for clamping bait against the first mentioned shank, a keeper carried by the outer end of the first mentioned shank and provided with pockets for receiving the free ends of the bait-carrying shanks for locking the bait-carrying shanks in a closed position, and said keeper having longitudinally extending slots for receiving the free ends of the bait-carrying shanks and permitting the passing of the free ends of the bait-carrying shanks into the pockets of said keeper.

3. As an article of manufacture, a bait carrier and hook of the class described comprising an elongated shank having an outwardly bent hook, a longitudinally extending substantially straight bait-carrying shank secured at its inner end to the first mentioned shank at a position adjacent the hook, the bait-carrying shank being movable to a position substantially parallel throughout its length to the first mentioned shank to provide an open throat and unobstructed hook, and means for holding the outer end of the bait-carrying shank in a locked position and in approximately parallel relation throughout its length with the first mentioned shank.

HARRY L. LUDWIG.